United States Patent
Gunturi et al.

(10) Patent No.: US 12,445,965 B2
(45) Date of Patent: Oct. 14, 2025

(54) SYSTEM AND METHOD TO REDUCE POWER CONSUMPTION BY USING ADAPTIVE TRANSMIT POWER DURING SNIFF ATTEMPTS

(71) Applicant: Silicon Laboratories Inc., Austin, TX (US)

(72) Inventors: Karthik Gunturi, Hyderabad (IN); Sunit Pujari, Hyderabad (IN); Niranjan Kumar Jonnada, Hyderabad (IN); Venkat Rao Gunturu, Hyderabad (IN)

(73) Assignee: Silicon Laboratories Inc., Austin, TX (US)

( * ) Notice: Subject to any disclaimer, the term of this patent is extended or adjusted under 35 U.S.C. 154(b) by 384 days.

(21) Appl. No.: 18/116,663

(22) Filed: Mar. 2, 2023

(65) Prior Publication Data
US 2024/0298260 A1 Sep. 5, 2024

(51) Int. Cl.
*H04W 52/02* (2009.01)
*H04W 52/28* (2009.01)

(52) U.S. Cl.
CPC ..... *H04W 52/0229* (2013.01); *H04W 52/286* (2013.01)

(58) Field of Classification Search
CPC .................. H04W 52/0229; H04W 52/286
See application file for complete search history.

(56) References Cited

U.S. PATENT DOCUMENTS

2009/0196209 A1* 8/2009 Haartsen ........... H04W 52/0216
 370/311
2024/0267905 A1* 8/2024 Robin ................. H04W 52/143

* cited by examiner

*Primary Examiner* — Nizam U Ahmed
(74) *Attorney, Agent, or Firm* — Nields, Lemack & Frame, LLC

(57) ABSTRACT

Systems and methods for reducing power consumption by using adaptive transmit power during sniff intervals are disclosed. The central device transmits the first packet of the sniff interval using the previously negotiated transmit power. After the central device receives a response from the peripheral device, the central device uses a lower transmit power for subsequent POLL packets during that sniff interval. This scheme may reduce the power consumption of the central device significantly, especially when a large number of packets are transmitted during each sniff interval.

17 Claims, 4 Drawing Sheets

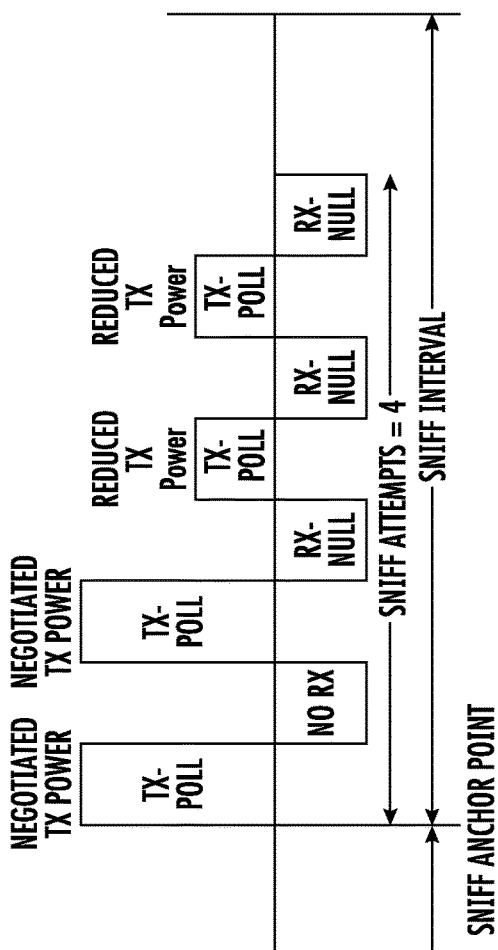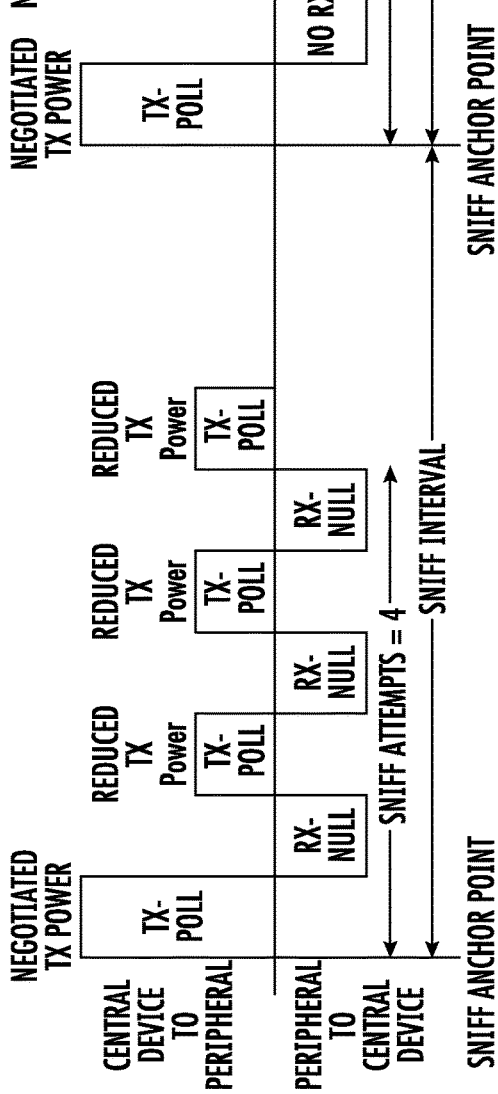
FIG. 3A
FIG. 3B
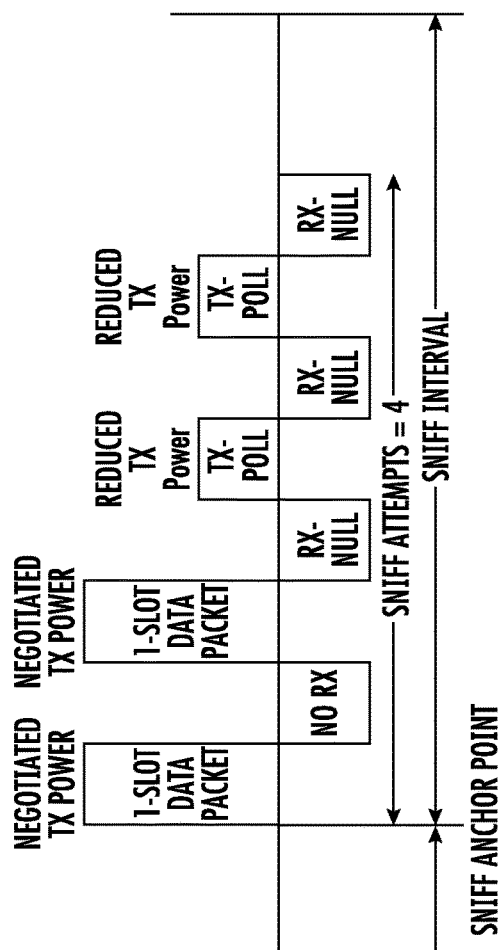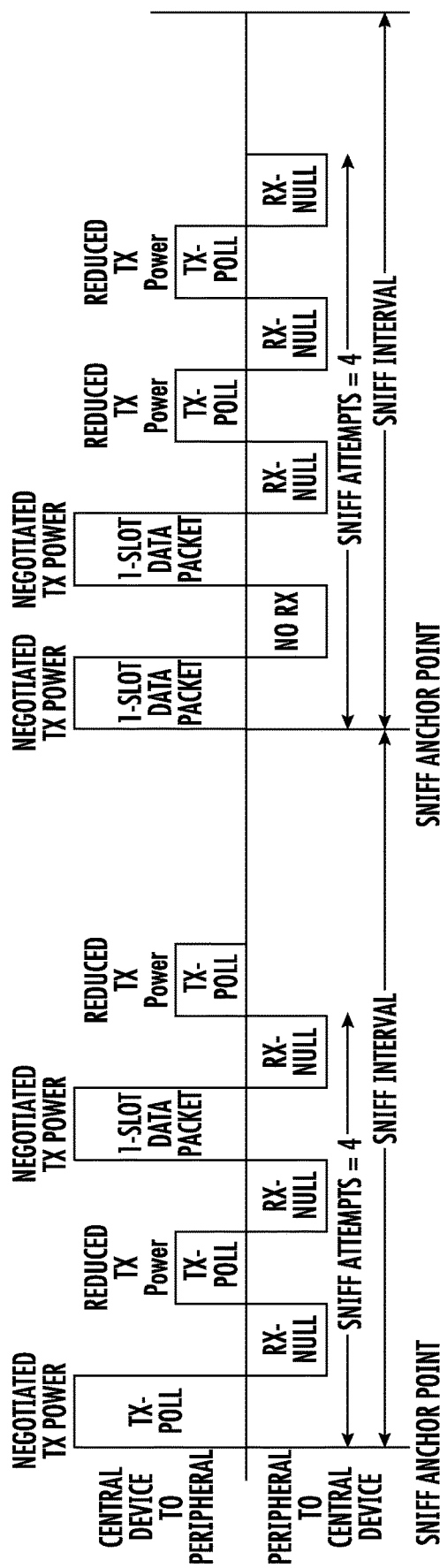
FIG. 3C
FIG. 3D

SYSTEM AND METHOD TO REDUCE POWER CONSUMPTION BY USING ADAPTIVE TRANSMIT POWER DURING SNIFF ATTEMPTS

FIELD

This disclosure describes a system and method for reducing power consumption during sniff attempts.

BACKGROUND

The sniff mode defined by the Bluetooth specification is a low power mode that is useful in reducing power consumption between two devices by determining the interval during which the central device and the peripheral device will communicate with each other. The central device negotiates various parameters, including sniff interval, and number of sniff attempts. The sniff interval defines the duration between successive polling intervals. Each sniff interval begins at a time referred to as the anchor point. The number of sniff attempts defines the number of packets that are transmitted performed during each sniff interval. The sniff interval is divided into a plurality of slots. In other words, assume the sniff interval is set to 100 slots, and the sniff attempts is set to 4. In this scenario, during each sniff interval, the central node will issue four packets in successive even-numbered slots and then stop transmitting until the beginning of the next sniff interval. Thus, if the peripheral device is synchronized to the central device, it will exit sleep mode prior to the start of the sniff interval, so that it may receive one or more of the packets being transmitted by the central device during this sniff interval. After one or more of the packets are received, the peripheral device may return to a sleep mode until the start of the next sniff interval.

These packets are transmitted to ensure that the peripheral device remains synchronized to the central device. In certain embodiments, these packets may be POLL packets, which do not have any associated data. The transmission of multiple POLL packets has two purposes. The first purpose is to ensure that the peripheral device receives at least one POLL Packet, even in the presence of other traffic or noise. The second purpose is that multiple sniff attempts also allow the central device to transmit a new DATA packet if new data becomes available during the sniff interval. However, if the central device does not have any data to transmit, it simply transmits additional POLL packets. Thus, in many scenarios, after the central device has received a response from the peripheral device, the remaining POLL packets are not truly necessary. In other words, a sniff attempt value that is greater than one often results in wasted power consumption by the central device. However, the Bluetooth specification suggests that central nodes perform these sniff attempts during each sniff interval.

Therefore, it would be beneficial if there was a system and method that allowed the central device to conform to the Bluetooth specification, but also reduced transmit power consumption.

SUMMARY

Systems and methods for reducing power consumption by using adaptive transmit power during sniff intervals are disclosed. The central device transmits the first packet of the sniff interval using the previously negotiated transmit power. After the central device receives a response from the peripheral device, the central device uses a lower transmit power for subsequent POLL packets during that sniff interval. This scheme may reduce the power consumption of the central device significantly, especially when a large number of packets are transmitted during each sniff interval.

According to one embodiment, a method of communicating between a central device and a peripheral device in a Bluetooth network during a sniff interval is disclosed, wherein a plurality of packets are transmitted by the central device to the peripheral device during the sniff interval. The method comprises transmitting a first packet from the central device to the peripheral device using a previously negotiated transmit power; and transmitting at least one of the plurality of packets remaining to be transmitted using a transmit power lower than the previously negotiated transmit power. In some embodiments, the first packet is a POLL packet. In some embodiments, the first packet is a DATA packet. In some embodiments, at least one of the plurality of packets remaining to be transmitted after the peripheral device has responded to a packet is a DATA packet, and the central device transmits the DATA packet at the previously negotiated transmit power. In some embodiments, at least one of the plurality of packets remaining to be transmitted after the peripheral device has responded to a packet is a POLL packet and the POLL packet is transmitted by the central device using the reduced transmit power. In some embodiments, the previously negotiated transmit power is used until a response is received from the peripheral device.

According to another embodiment, a method of communicating between a central device and a peripheral device in a Bluetooth network during a sniff interval is disclosed, wherein a plurality of packets are transmitted by the central device to the peripheral device during the sniff interval. The method comprises transmitting a first packet from the central device to the peripheral device using a previously negotiated transmit power; selecting a reduced transmit power if a response to any packet transmitted during the sniff interval has been received from the peripheral device and selecting the previously negotiated transmit power if a response has not been received to any packet from the peripheral device; transmitting a subsequent POLL packet from the central device to the peripheral device using the selected transmit power; and repeating the selecting and transmitting until the plurality of packets are transmitted. In some embodiments, the first packet is a POLL packet. In some embodiments, the first packet is a DATA packet. In some embodiments, at least one of the plurality of packets remaining to be transmitted after the peripheral device has responded to a packet is a DATA packet, and the central device transmits the DATA packet at the previously negotiated transmit power. In embodiments, all packets remaining to be transmitted after the peripheral device has responded to a packet are POLL packets and all remaining packets are transmitted by the central device using the reduced transmit power.

According to another embodiment, a Bluetooth network device is disclosed. The Bluetooth network device comprises a Bluetooth transceiver; a processing unit; and a memory device, comprising instructions, which when executed by the processing unit, enable the Bluetooth network device to: transmit a first packet of a plurality of packets to be transmitted during a sniff interval to a peripheral device using a previously negotiated transmit power; and transmit at least one of the plurality of packets remaining to be transmitted during the sniff interval using a transmit power lower than the previously negotiated transmit power. In some embodiments, the first packet is a POLL packet. In some embodiments, the first packet is a DATA packet. In some embodiments, at least one of the plurality of packets remaining to be transmitted after the peripheral device has responded to a packet is a DATA packet, and the memory device further comprises instructions that enable the Bluetooth network device to: transmit the DATA packet at the previously negotiated transmit power. In some embodiments, at least one of the plurality of packets remaining to be transmitted after the peripheral device has responded to a packet is a POLL packet and the memory device further comprises instructions that enable the Bluetooth network device to: transmit the POLL packet using a reduced transmit power.

BRIEF DESCRIPTION OF THE DRAWINGS

For a better understanding of the present disclosure, reference is made to the accompanying drawings, in which like elements are referenced with like numerals, and in which:

FIG. 3A-3D shows timing diagrams illustrating the operation of the central node during the sniff interval.

DETAILED DESCRIPTION

Figure 1A:
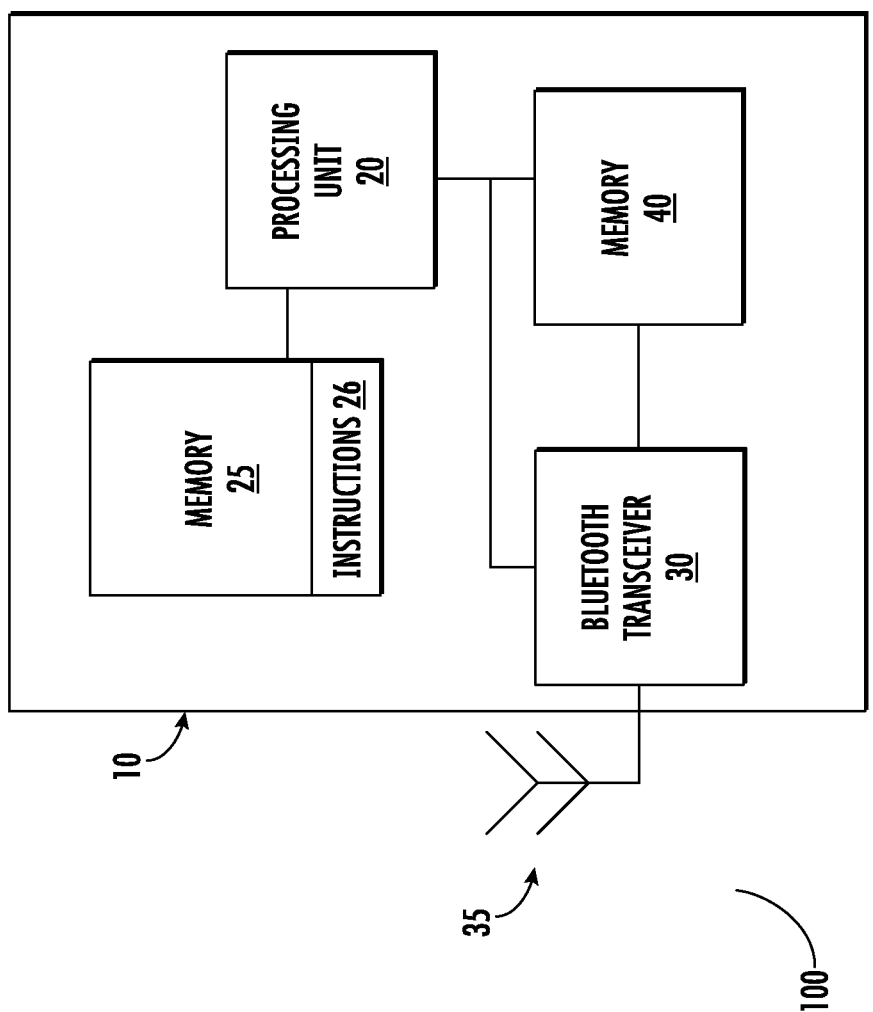
FIG. 1A shows a block diagram of a Bluetooth device according to one embodiment.

FIG. 1A shows a block diagram of a representative Bluetooth device 10 that may be used to perform multiple sniff attempts during each sniff interval while reducing power consumption. The Bluetooth device 10 may be a central device that is configured to transmit multiple POLL packets during each sniff interval.

The Bluetooth device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions 26, which, when executed by the processing unit 20, enable the Bluetooth device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1A. The second computer readable non-transitory media may be a CDROM, or a different memory device, which is located remote from the Bluetooth device 10. The instructions contained on this second computer readable non-transitory media may be downloaded onto the memory device 25 to allow execution of the instructions by the Bluetooth device 10.

The Bluetooth device 10 also includes a Bluetooth transceiver 30 that connects with a Bluetooth network 100 using an antenna 35.

The Bluetooth device 10 may include a second memory device 40 in which data that is received and transmitted by the Bluetooth transceiver 30 is stored. This second memory device 40 is traditionally a volatile memory. The processing unit 20 has the ability to read and write the second memory device 40 so as to communicate with the other devices in the Bluetooth network 100.

Although not shown, the Bluetooth device 10 also has a power supply, which may be a battery or a connection to a permanent power source, such as a wall outlet.

While the processing unit 20, the memory device 25, the Bluetooth transceiver 30 and the second memory device 40 are shown in FIG. 1A as separate components, it is understood that some or all of these components may be integrated into a single electronic component. Rather, FIG. 1A is used to illustrate the functionality of the Bluetooth device 10, not its physical configuration.

Figure 1B:
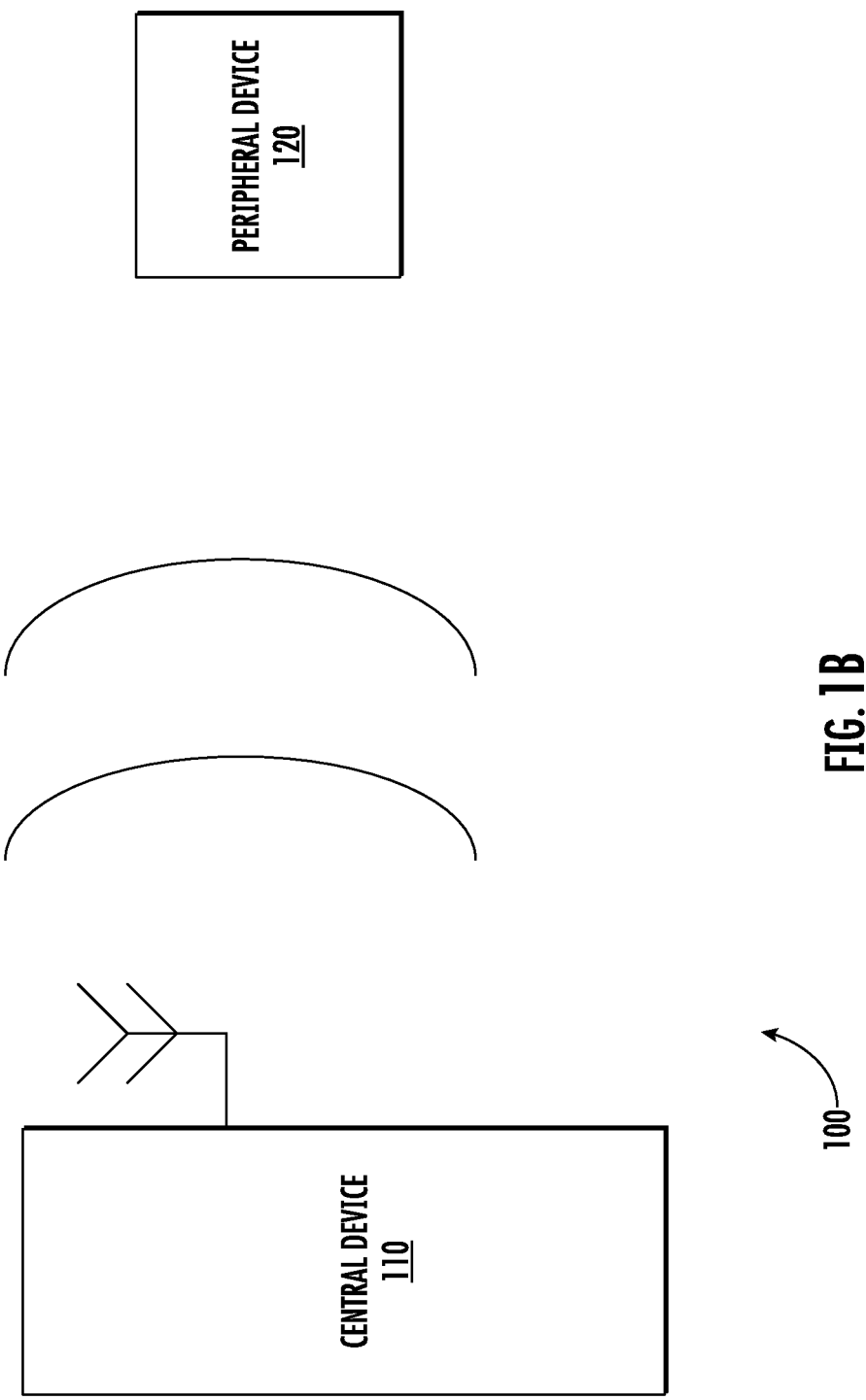
FIG. 1B shows a Bluetooth network including a central device and a peripheral device.

FIG. 1B shows a Bluetooth network 100 that includes a central device 110 and a peripheral device 120. In some embodiments, the central device 110 and the peripheral device 120 both have an architecture similar to that shown in FIG. 1A. However, the processing power, memory capability and power requirements of the central device 110 may be greater than that of the peripheral device.

During initialization, the central device 110 and the peripheral device 120 will negotiate various parameters. These parameters include sniff interval, sniff attempts and transmit power for the central device 110. Other parameters may also be negotiated, but these three are described in more detail herein.

For example, with respect to transmit power, the central device may transmit a packet to the peripheral device. If the received signal characteristics differ from the values desired by the peripheral device, the peripheral device may transmit a request to the central device to either increase or decrease the transmit power. This may continue until the signal characteristics are acceptable to the peripheral device. The result of this sequence is the negotiated transmit power.

The negotiation of these parameters is described in the Bluetooth specification and therefore is not described in further detail in this disclosure.

Figure 2:
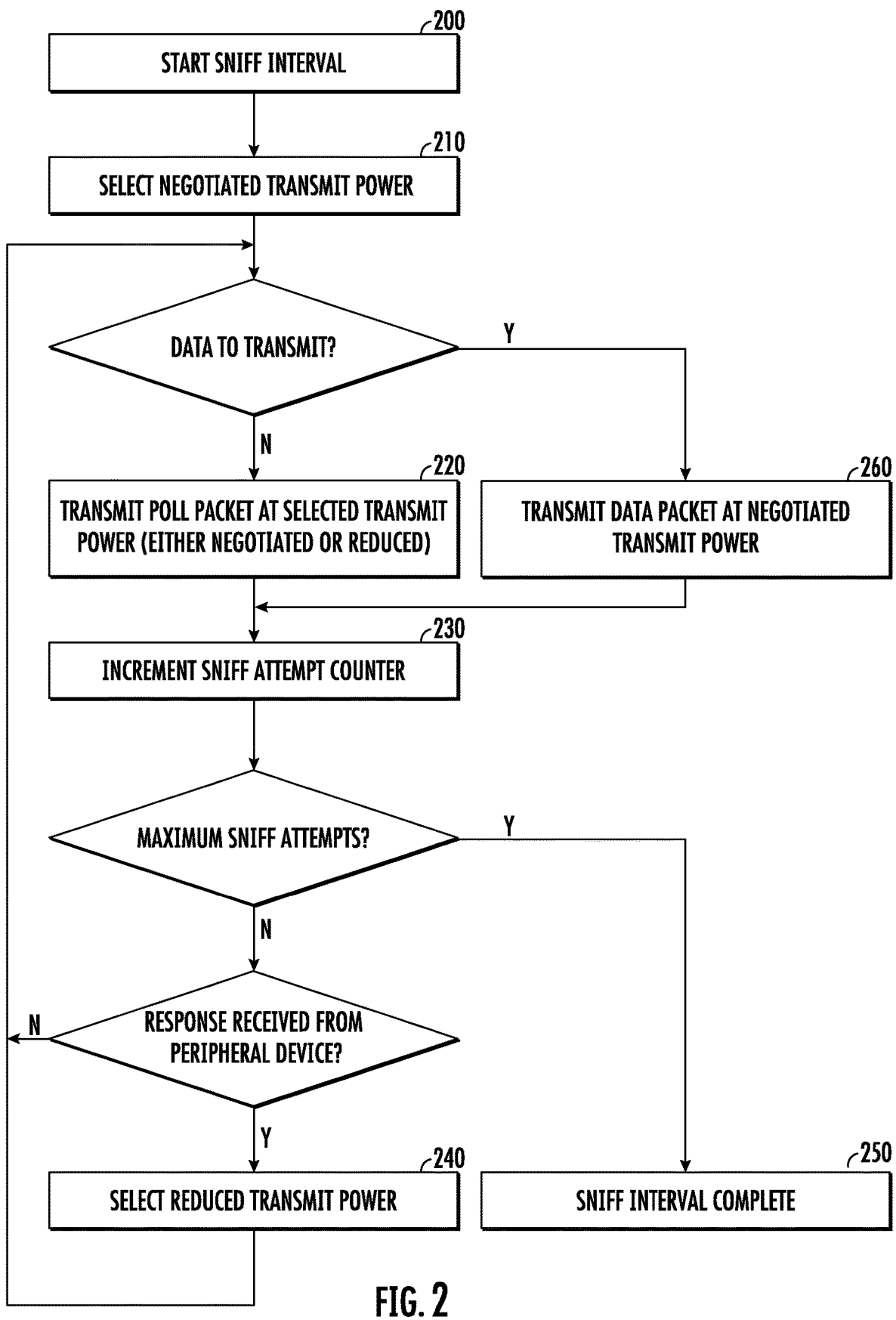
FIG. 2 shows a flowchart that may be executed by the central device.

FIG. 2 shows the operation of the central device 110. First, after the expiration of a timer, the sniff interval begins at the anchor point, as shown in Box 200. Since the sniff interval has just begun, the previously negotiated transmit power is selected, as shown in Box 210. Next, the central device 110 determines whether there are any data packets to transmit. If there is not a data packet, the central device 110 then transmits a POLL packet, as shown in Box 220. Note that since the negotiated transmit power was selected, the POLL packet is transmitted using the previously negotiated transmit power.

After the POLL packet is transmitted, the number of sniff attempts is incremented, as shown in Box 230. Next, the central device 110 checks if the number of sniff attempts has reached the negotiated value. If so, the operation of the central device 110 is complete for this sniff interval, as shown in Box 250. If the number of sniff attempts has not reached the negotiated value, the central device 110 checks if a response was received from the peripheral device 120. If a response was successfully received, the central device 110 selects a reduced transmit power, as shown in Box 240, indicating that subsequent POLL packets are to be transmitted by the central device 110 at a reduced transmit power. If a response was not received from the peripheral device 120, the selected transmit power remains unchanged. Note that this sequence ensures that the reduced transmit power is used for all subsequent POLL packets after a response is received to any packet (such as POLL, NULL and DATA packets). The central device 110 then repeats the sequence described above. Note that if the central device 110 has a DATA packet to transmit, this DATA packet is transmitted using the negotiated transmit power, regardless of the state of the selected transmit power.

Thus, by executing the sequence shown in FIG. 2, there are several important results. First, if any POLL packets are transmitted, at least one POLL packet is transmitted by the central device 110 at the negotiated transmit power. The reduced transmit power is not used until the central device 110 receives a successful response from the peripheral device 120. Note that the reduced transmit power is never used for data packets. Further, this sequence ensures that the POLL packets are transmitted using the negotiated transmit power until it is determined that the peripheral device 120 successfully received a packet. In this way, synchronization between the central device 110 and the peripheral device 120 is maintained.

FIGS. 3A-3D shows exemplary timing diagrams that show the operation of the central device 110. In each of these examples, the number of sniff attempts is set to 4.

In FIG. 3A, the peripheral device 120 returns a success response to the first POLL packet. Consequently, the next three POLL packets are all transmitted by the central device 110 at a reduced transmit power.

In FIG. 3B, the peripheral device 120 did not respond to the first POLL packet. Consequently, the central device 110 transmits the second POLL packet at the negotiated transmit power. Since the peripheral device 120 responded to the second POLL Packet, the remaining two POLL packets are transmitted by the central device 110 at the reduced transmit power. Note that if the peripheral device 120 had not responded to the second POLL packet, the central device 110 would transmit the third POLL packet at the negotiated transmit power, since the transmit power is not reduced until a successful response is received from the peripheral device 120.

In FIG. 3C, the central device 110 determines that it has data to transmit during this sniff interval. However, this data was not available until after the anchor point. The central device 110 begins the sniff interval by transmitting a POLL packet, as described above. In this example, the peripheral device 120 responds to the first POLL packet. Therefore, the central device 110 transmits the second POLL packet using the reduced transmit power. After the second POLL Packet has been transmitted, the central device 110 determines that it has a DATA packet to transmit. In this example, the DATA packet only requires one slot. Thus, during the third time slot, the central device 110 transmits the DATA packet. Note that since this is a DATA packet, it is transmitted at the negotiated transmit power. After the DATA packet has been transmitted and successfully received, the central device 110 then sends the last POLL packet at the reduced transmit power. Thus, as described above, DATA packets are always sent at the negotiated transmit power, regardless of the transmit power used for the POLL packets.

In FIG. 3D, the central device 110 determines that it has data to transmit prior to the start of the sniff interval. Thus, the central device 110 begin the sniff interval by transmitting a DATA packet. In this example, the peripheral device 120 does not respond to the first DATA packet. Therefore, the central device 110 retransmits the DATA packet again during the second slot. The peripheral device 120 responds to the second DATA packet. After this, the central device 110 transmits two POLL packets. Since the peripheral device 120 responded successfully to the second DATA packet, these POLL packets are transmitted at the reduced transmit power.

As noted above, once the central device 110 receives a successful response from the peripheral device 120, it may transmit all remaining POLL packets in the sniff interval using a reduced transmit power. In some embodiments, the reduced transmit power is less than or equal to 50% of the negotiated transmit power. In certain embodiments, the reduced transmit power is less than or equal to 25% of the negotiated transmit power. Note that the Bluetooth specification specifies transmit power based on the class of the device. Therefore, the reduced transmit power may be implementation specific, depending on the amount of power savings desired while conforming to the Bluetooth specification.

The present system and method have many advantages. As noted above, the use of multiple POLL packets during each sniff interval may be unnecessary, as the connection between the central device 110 and the peripheral device 120 is synchronized as soon as the peripheral device 120 responds to any of the packets transmitted during the sniff interval. The present scheme has the ability to reduce power consumption by the central device 110 significantly. For example, assume that the number of sniff attempts is set to 4 and that the central device 110 transmits at half power after receiving a response from the peripheral device 120. If the response is received in response to the first POLL packet, as shown in FIG. 3A, the transmit power consumed by the central device 110 during this sniff interval will be only 62.5% of the transmit power used by a conventional central device (which represents a savings of 37.5%). Even if the response is not received until after the second POLL packet, as shown in FIG. 3B, the transmit power will still be reduced by 25%. Further, if the central device 110 transmits at one quarter power after receiving a response from the peripheral device 120, these power savings are even greater. For example, if the response is received after the first POLL packet, as shown in FIG. 3A, the total transmit power used by the central device 110 during the sniff interval is only 43.75% of the transmit power used by a conventional central device. Even if the response is not received until after the second POLL packet, as shown in FIG. 3B, the transmit power will still be reduced by 37.5%.

If the central device 110 also intended to transmit a DATA packet in the third slot, as shown in FIG. 3C, the total transmit power needed during the sniff interval is still reduced. If the central device 110 transmits at half power after receiving a response, the transmit power consumed by the central device 110 during this sniff interval will be 75% of the transmit power used by a conventional central device. If the central device 110 transmits at one quarter power, the total transmit power during this sniff interval is reduced by 37.5%.

FIG. 3D is similar to FIG. 3B, except the central device 110 is attempting to transmit a DATA packet rather than a POLL or NULL packet. The power savings are the same as described for FIG. 3B. The following table shows the power savings described above.

TABLE 1

| Reduced Power Level | FIG. 3A | FIG. 3B | FIG. 3C | FIG. 3D |
|---|---|---|---|---|
| Half power | 37.5% | 25% | 25% | 25% |
| Quarter power | 56.25% | 37.5% | 37.5% | 37.5% |

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of communicating between a central device and a peripheral device in a Bluetooth network during a sniff interval, wherein a plurality of packets are transmitted by the central device to the peripheral device during the sniff interval, the method comprising:
    transmitting a first packet from the central device to the peripheral device using a previously negotiated transmit power; and
    transmitting, from the central device to the peripheral device, at least one of the plurality of packets remaining to be transmitted using a transmit power lower than the previously negotiated transmit power, after a response to any of the plurality of packets has been received from the peripheral device.

2. The method of claim 1, wherein the first packet is a POLL packet.

3. The method of claim 1, wherein the first packet is a DATA packet.

4. The method of claim 1, wherein at least one of the plurality of packets remaining to be transmitted after the peripheral device has responded to a packet is a DATA packet, and wherein the central device transmits the DATA packet at the previously negotiated transmit power.

5. The method of claim 1, wherein at least one of the plurality of packets remaining to be transmitted after the peripheral device has responded to a packet is a POLL packet and the POLL packet is transmitted by the central device using the reduced transmit power.

6. The method of claim 1, wherein the previously negotiated transmit power is used until a response is received from the peripheral device.

7. A method of communicating between a central device and a peripheral device in a Bluetooth network during a sniff interval, wherein a plurality of packets are transmitted by the central device to the peripheral device during the sniff interval, the method comprising:
    transmitting a first packet from the central device to the peripheral device using a previously negotiated transmit power;
    selecting a reduced transmit power if a response to any packet transmitted during the sniff interval has been received from the peripheral device and selecting the previously negotiated transmit power if a response has not been received to any packet from the peripheral device;
    transmitting a subsequent POLL packet from the central device to the peripheral device using the selected transmit power; and
    repeating the selecting and transmitting until the plurality of packets are transmitted.

8. The method of claim 7, wherein the first packet is a POLL packet.

9. The method of claim 7, wherein the first packet is a DATA packet.

10. The method of claim 7, wherein at least one of the plurality of packets remaining to be transmitted after the peripheral device has responded to a packet is a DATA packet, and wherein the central device transmits the DATA packet at the previously negotiated transmit power.

11. The method of claim 7, wherein all packets remaining to be transmitted after the peripheral device has responded to a packet are POLL packets and all remaining packets are transmitted by the central device using the reduced transmit power.

12. A Bluetooth network device, comprising:
    a Bluetooth transceiver;
    a processing unit; and
    a memory device, comprising instructions, which when executed by the processing unit, enable the Bluetooth network device to:
        transmit a first packet of a plurality of packets to be transmitted during a sniff interval to a peripheral device using a previously negotiated transmit power; and
        transmit at least one of the plurality of packets remaining to be transmitted during the sniff interval to the peripheral device using a transmit power lower than the previously negotiated transmit power, after a response to any of the plurality of packets has been received from the peripheral device.

13. The Bluetooth network device of claim 12, wherein the memory device further comprises instructions that enable the Bluetooth network device to: use the previously negotiated transmit power until a response is received from the peripheral device.

14. The Bluetooth network device of claim 12, wherein the first packet is a POLL packet.

15. The Bluetooth network device of claim 12, wherein the first packet is a DATA packet.

16. The Bluetooth network device of claim 12, wherein at least one of the plurality of packets remaining to be transmitted after the peripheral device has responded to a packet is a DATA packet, and wherein the memory device further comprises instructions that enable the Bluetooth network device to: transmit the DATA packet at the previously negotiated transmit power.

17. The Bluetooth network device of claim 12, wherein at least one of the plurality of packets remaining to be transmitted after the peripheral device has responded to a packet is a POLL packet and wherein the memory device further comprises instructions that enable the Bluetooth network device to: transmit the POLL packet using a reduced transmit power.

* * * * *